(12) United States Patent
Kuwabara et al.

(10) Patent No.: US 7,258,908 B2
(45) Date of Patent: Aug. 21, 2007

(54) ANTI-GLARE FILM, METHOD OF PRODUCING THE SAME, AND DISPLAY EQUIPPED WITH THE SAME

(75) Inventors: Masato Kuwabara, Tsukuba (JP); Yasuteru Maeda, Moriya (JP)

(73) Assignee: Sumitomo Chemical Co., Ltd., Osaka (JP)

( * ) Notice: Subject to any disclaimer, the term of this patent is extended or adjusted under 35 U.S.C. 154(b) by 0 days.

(21) Appl. No.: 10/755,848

(22) Filed: Jan. 13, 2004

(65) Prior Publication Data

US 2004/0209113 A1  Oct. 21, 2004

(30) Foreign Application Priority Data

Jan. 16, 2003  (JP) .............................. 2003-008744

(51) Int. Cl.
*B32B 3/26* (2006.01)
*G02B 1/11* (2006.01)

(52) U.S. Cl. ...................... 428/141; 428/156; 428/913; 359/601; 359/609; 359/613; 264/219

(58) Field of Classification Search ................ 428/141, 428/156, 913; 359/601, 609, 613; 264/219
See application file for complete search history.

(56) References Cited

U.S. PATENT DOCUMENTS 4,013,465 A * 3/1977 Clapham et al. ............... 430/11
4,114,983 A * 9/1978 Maffitt et al. ................ 359/580

FOREIGN PATENT DOCUMENTS

JP  09-021903  1/1997
JP  2002-365410  12/2002

* cited by examiner

*Primary Examiner*—William P. Watkins, III
(74) *Attorney, Agent, or Firm*—Fitch Even Tabin & Flannery

(57) ABSTRACT

The present invention provides an anti-glare film having rough surface of which R (0) and R (30 or more)/R (0) are 1% or less and 0.001 or less, respectively, wherein R (0) is if the regular reflectance along the regular reflection direction against incidence light at any angle from 5 to 30° from the normal line of said anti-glare film and R (30 or more) is the reflectance against said incidence light, along a direction inclined by 30° or more toward said anti-glare film side from said normal reflection direction. And the present invention also provides the method of producing the above-mentioned anti-glare film.

10 Claims, 4 Drawing Sheets ered by scattering light and display shows turbid color.
ANTI-GLARE FILM, METHOD OF PRODUCING THE SAME, AND DISPLAY EQUIPPED WITH THE SAME This U.S. application claims the priority benefit under 35 U.S.C. §119 of JP 2003-008744, filed Jan. 16, 2003, the complete disclosure of which is incorporated herein by reference.

FIELD OF THE INVENTION

The present invention relates to an anti-glare film, a method of producing the same, and a display equipped with the anti-glare film.

BACKGROUND OF THE INVENTION

Image displays such as liquid crystal displays, plasma display panels, CRT displays, organic EL displays and the like show remarkable deterioration in visibility when outer light is reflected in its display surface. For preventing such reflection of outer light, there is conventionally provided a film layer of preventing reflection of outer light on the surface of an image display, in televisions and personal computers in which image quality is valued, video cameras and distal cameras used outside under strong outer light, and portable telephones effecting display utilizing reflection light. This film layer is usually classified into those made of a film on which non-reflection treatment has been performed by interference of an optical multi-layer film, and those made of a film on which anti-glare treatment has been performed forming fine roughness on the surface to scatter incident light to shade off a reflection image. Of these, the former non-reflection film has high cost due to necessity of forming a multi-layer film of uniform optical membrane thickness. In contrast, the latter anti-glare film is used widely in applications such as large size personal computers, monitors since it can be produced at relatively low cost.

Such an anti-glare film is conventionally produced by, for example, a method in which a solvent dispersing a filler is applied on a base material sheet and the applied membrane thickness is controlled to cause exposure of a filler on the surface of the applied membrane, forming random roughness on the sheet.

However, an anti-glare film produced by such a method does not necessarily have roughness as intended and an anti-glare function is not obtained sufficiently since the location and form of irregularity of roughness are affected by the dispersed condition of a filler in a solvent, applied condition thereof, and the like. Further, when such a conventional anti-glare film is placed on the surface of an image display, there is a tendency of generation of so-called white browning in which all display surface becomes totally whity because of scattering light and display shows turbid color.

On the other hand, in a micro lens array plate used in liquid crystal displays, concave lens and convex lens are generally placed with regularity, and JP No. 9-21903A describes a micro lens array plate in which adjacent fine lenses are repeatedly placed alternately so that they do not mutually contact. However, even in the case of an anti-glare film obtained by forming roughness of regular disposition on a film as described above, light diffraction occurs due to the distribution of uniform distance between concave or convex lens and a film looks rainbow color to decrease the visibility of a display surface.

An object of the present invention is to provide an anti-glare film in which generation of white browning and decrease in visibility due to light diffraction are sufficiently prevented while maintaining an excellent anti-glare function, a method of producing the same, and a display equipped with this anti-glare film.

SUMMARY OF THE INVENTION

The present inventors have intensively studied to attain the above-mentioned object, and resultantly found that, on an anti-glare film having roughness formed on its surface, if the above-mentioned roughness is formed with suitable variation satisfying a specific condition, then, regular reflectance along the regular reflection direction against incidence light at given angle on the above-mentioned anti-glare film and the ratio of the reflectance against the above-mentioned incidence light, along a direction inclined by given angle or more toward the film side from the normal reflection direction, to the above-mentioned regular reflectance, are respectively in given ranges, and by this, the anti-glare function of the anti-glare film is improved and-generation of white browning and decrease in visibility due to light diffraction are sufficiently prevented, leading to completion of the present invention.

Namely, the anti-glare film of the present invention is an anti-glare film having rough surface of which R (0) is 1% or less, and R (30 or more)/R (0) is 0.001 or less, respectively, wherein R (0) is the regular reflectance along the regular reflection direction against incidence light at any angle from 5 to 30° from the normal line of the above-mentioned anti-glare film and R (30 or more) is the reflectance against the above-mentioned incidence light, along a direction inclined by 30° or more toward the above-mentioned anti-glare film side from the above-mentioned normal reflection direction. By satisfying such a condition, an anti-glare film can be obtained in which generation of white browning and decrease in visibility due to light diffraction are sufficiently prevented while maintaining an excellent anti-glare function.

In the anti-glare film of the present invention, it is preferable that the 60° reflection definition is 200% or less. By satisfying such a condition, there is a tendency of obtaining an excellent anti-glare function.

Further, in the anti-glare film of the present invention, it is preferable that, when the roughness of the surface is divided into unit cells having a plurality of irregularities, the irregularities constitute mutual translational symmetry with irregularities in other unit cells, and the average value of minimum distances between peaks of the above-mentioned irregularities ($m_1$) and the standard deviation of the above-mentioned minimum distances ($\sigma_1$) in the above-mentioned unit cells satisfies the condition according to the following formula:

$$0.05 \leq \sigma_1/m_1 \leq 0.3$$

By forming irregularities of the roughness on an anti-glare film so as to satisfy such a condition, there is a tendency that the reflection property as described above is obtained, and generation of white browning and decrease in visibility due to light diffraction due to the distribution of uniform distance between the irregularities of roughness may be sufficiently prevented while maintaining an excellent anti-glare function.

The method of producing an anti-glare film of the present invention is a method of producing an anti-glare film comprising a step of performing gradient exposure on a photoresist formed on a base material, a step of conducting development treatment thereon to form roughness on the above-mentioned photo-resist, a step of electro-casting a metal on the above-mentioned photo-resist, a step of peeling the above-mentioned metal from the above-mentioned photo-resist to produce a metal plate transferred the roughness, and a step of transferring the above-mentioned roughness onto a film using the above-mentioned metal plate. According to such a production method, an anti-glare film of the present invention having rough surface as described above and having the above-mentioned reflection property can be produced easily and securely.

Further, the method of producing an anti-glare film of the present invention is preferably a method producing an anti-glare film, comprising a step of performing gradient exposure on a photo-resist formed on a base material, a step of conducting development treatment thereon to form roughness on the above-mentioned photo-resist, a step of electro-casting a metal on the above-mentioned photo-resist, a step of peeling the above-mentioned metal from the above-mentioned photo-resist to produce a metal plate transferred the roughness, a step of winding the above-mentioned metal plate on the surface of a roll to produce an emboss roll having the above-mentioned roughness on its surface, and a step of continuously transferring the above-mentioned roughness onto a film using the above-mentioned emboss roll. According to such a production method, there occurs a tendency that an anti-glare film of the present invention having rough surface as described above and having the above-mentioned reflection property can be produced more easily and securely.

Furthermore, it is preferable that the above-mentioned gradient exposure in the above-mentioned exposure step is conducted by performing proximity exposure via at least a photo-mask of two gradients on the above-mentioned photo-resist, and the distance between the above-mentioned photo-mask and the above-mentioned photo-resist (L μm) and the outer dimension of transmission portions of the above-mentioned photo-mask (D μm), satisfies the following formula:

$$1.3 \leq L/D^2 \leq 2.8,$$

or conducted via at least a photo-mask of multi gradients on the above-mentioned photo-resist, or conducted by using a space light modulation element capable of changing the light intensity of an exposure light source with at least on the location on the above-mentioned photo-resist. By such gradient exposure, there occurs a tendency that an anti-glare film of the present invention having rough surface as described above and having the above-mentioned reflection property can be produced more easily and securely.

The display of the present invention is a display equipped with an anti-glare film as described above. Such a display can obtain high visibility due to an excellent anti-glare function possessed by the above-mentioned anti-glare film of the present invention.

Figure 1:
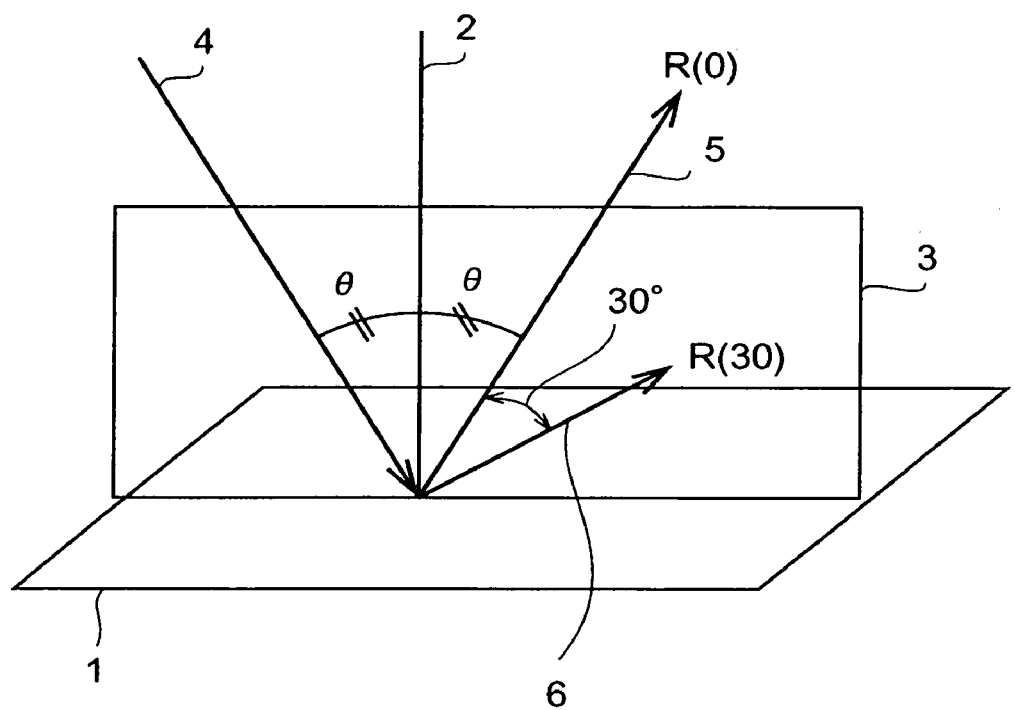
FIG. 1 is a schematic view showing the incidence direction and the reflection direction of light for an anti-glare film of the present invention.

1: anti-glare film
2: normal line of anti-glare film
3: plane including normal line and incidence light
4: incidence light
5: reflection light along normal reflection direction
6: reflection light along direction inclined by 30°

PREFERRED EMBODIMENTS OF THE PRESENT INVENTION

Suitable embodiments according to the present invention will be illustrated in detail below referring to appended drawings. In the descriptions of drawings, the same element is given the same mark and duplicate description will be omitted.

FIG. 1 is a schematic view showing the incidence direction and reflection direction of light for an anti-glare film. In the anti-glare film of the present invention, when the regular reflectance of reflection light 5 along the regular reflection direction against incidence light 4 at any angle θ of from 5 to 30° from the normal line 2 of the anti-glare film 1 is represented by R (0), then, R (0) is 1% or less, more preferably 0.7% or less. When the regular reflectance R (0) of the anti-glare film is over 1%, a sufficient anti-glare function is not obtained, resulting in lowering visibility.

Figure 2:
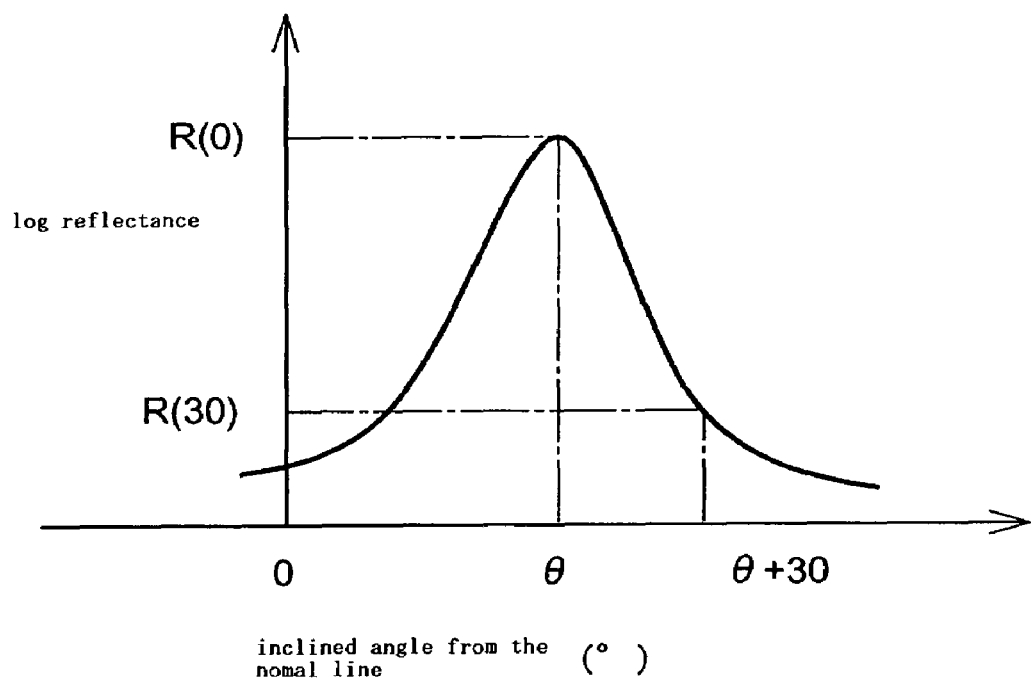
FIG. 2 is a graph showing a relation of log reflectance and inclined angle in the reflection direction from the normal line of an anti-glare film, of reflection light against the incidence light at angle θ from the normal line of an anti-glare film.

FIG. 2 is a graph showing a relation of log reflectance and inclined angle in the reflection direction from the normal line, of reflection light 5 against the incidence light 4 at angle θ from the normal line 2 of the anti-glare film 1. As shown in this graph, the regular reflectance R (0) is, in general, the peak of reflectance against incidence light 4 at angle θ, and there is a tendency that reflectance lowers when angle is deviated from the regular reflection direction. In the anti-glare film of the present invention, if the reflectance against the incidence light 4, along a direction inclined by 30° or more toward the film side from the normal reflection direction in a plane 3 including the normal line 2 and incidence light 4 is represented by R (30 or more), the value of R (30 or more)/R (0) is 0.001 or less, more preferably 0.0005 or less, further preferably 0.0001 or less. When the value of R (30 or more)/R (0) is over 0.001, white browning and diffraction of light occur on an anti-glare film, to lower visibility. For example, even when black is displayed on a display under condition of setting of an anti-glare film on the most front surface of the display, white browning occurs in which the display surface absorbs lights from surroundings to show total whitening of the surface. In FIGS. 1 and 2, R (30) represents the reflectance against the incidence light 4 of reflection light 6, along a direction inclined by 30° toward the film side from the normal reflection direction in a plane 3 including the normal line 2 and incidence light 4.

In measuring the reflectance of an anti-glare film of the present invention, it is necessary to measure reflectance of 0.001% or less with good precision, therefore, a detector of wider dynamic range is necessary. As such a detector, it is possible to use, for example, a commercially available power meter and the like, and measurement can be conducted using a deformation photometer in which an aperture is provided before a detector of this powder meter so that the angle of viewing the anti-glare film is 2°. As the incidence light, visible beams of from 380 to 780 nm of wavelength can be used, and as the light source, a halogen lamp and the like can be used. In the case of a transparent anti-glare film having smooth rear surface, reflection from the rear surface of the anti-glare film may exert a reverse influence on measurement, therefore, it is preferable to optically close-adhering an anti-glare film using an adhesive material or liquid such as glycerin and the like onto a black acrylic plate and to measure only reflectance of the most front surface of the anti-glare film.

The anti-glare film of the present invention has roughness formed on its surface. This roughness may be composed of convex and/or concave, or peaks and/or valleys and is not particularly restricted providing that the area ratio of rough parts to parts without roughness and the shape of roughness satisfy the above-mentioned condition of the reflectance of an anti-glare film, and it is preferable that the area ratio of parts without roughness on the surface of an anti-glare film is smaller. The area ratio of parts without roughness based on the total area when an anti-glare film is viewed from the front surface is preferably 30% or less, more preferably 20% or less. When the area ratio of parts without roughness is over 30%, a regular reflection may be stronger and an anti-glare function may decrease. The shape of roughness when an anti-glare film is viewed from the front surface is defined by the shape formed by cutting roughness by a plane parallel to an anti-glare film plane at the average height of the roughness, and the outline of such shape includes, for example, circle, ellipse, polygon (rectangle, triangle, hexagon and the like) and undefined shapes obtained by combining these forms, and preferable are circle, ellipse and undefined shapes obtained by combining these forms. The average value of the dimension of this roughness is preferably from 1 to 50 µm, more preferably from 5 to 20 µm. The ratio of the average value of the difference of height between roughnesses to the average value of the outer size of roughness (level/outer size) is preferably from 0.01 to 0.2, more preferably from 0.05 to 0.1. The above-mentioned outer size means, when the outer form is circle, its diameter, and in the case of ellipse or polygon, twice of the average distance from the gravity center position to periphery. In the anti-glare film of the present invention, it is not necessary that the shapes of the above-mentioned roughness are all same, and the shapes, dimensions and the like of the roughness may be different.

The anti-glare film of the present invention has a 60° reflection definition of preferably 200% or less, more preferably 180% or less. When the 60° reflection definition is over 200%, a sufficient anti-glare function may not be obtained and visibility may lower.

The reflection definition of the anti-glare film of the present invention can be determined according to a method of measuring image definition by a reflection method described in JIS K 7105. The sum of image definitions measured by using four kinds of optical combs having optical comb width of 2 mm, 1 mm, 0.5 mm and 0.125 mm (400% at maximum) was used as the 60° reflection definition of the anti-glare film of the present invention.

Next, the disposition of irregularity of roughness on the anti-glare film of the present invention will be illustrated.

In the anti-glare film of the present invention, it is preferable that, when the roughness is divided into unit cells having a plurality of irregularities, the irregularities thereof constitute mutual translational symmetry with irregularities in other unit cells, and when the average value of minimum distances between peaks of the above-mentioned irregularities is represented by $m_1$ and the standard deviation of the above-mentioned minimum distances is represented by $\sigma_1$ in the above-mentioned unit cells, then, the value of $\sigma_1/m_1$ satisfies the condition according to the following formula:

$$0.05 \leq \sigma_1/m_1 \leq 0.3.$$

Here, the above-mentioned unit cell having a plurality of irregularities means a specific region containing a plurality of irregularities obtained by dividing the roughness on the surface of an anti-glare film, and in the anti-glare film of the present invention, such unit cells are placed so that the irregularities thereof constitute mutual translational symmetry with irregularities in other unit cells. By such placing of unit cells so as to constitute translational symmetry, there may occur a tendency that the reflection property as described above is obtained and an anti-glare film in which generation of white browning and lowering of visibility due to diffraction of light are sufficiently suppressed may be obtained while maintaining an excellent anti-glare function, and there is also a tendency that production of an anti-glare film may become easy. In the anti-glare film of the present invention, the above-mentioned unit cells may be placed with higher symmetry than translational symmetry.

The value of $\sigma_1/m_1$ in the above-mentioned unit cell can be obtained as described below. Namely, first, coordinates of tops or valleys of roughness on the surface of an anti-glare film are measured, and the shortest distance between top coordinates or valley coordinates among distances between mutually adjacent tops or mutually adjacent valleys is defined as the shortest distance between peaks of the above-mentioned irregularities. Next, thus obtained shortest distance is measured for all tops and valleys in the above-mentioned unit cells, and the average value $m_1$ and standard deviation $\sigma_1$ thereof are calculated, and the above-mentioned value of $\sigma_1/m_1$ can be calculated.

In the anti-glare film of the present invention, it is preferable that the value of $\sigma_1/m_1$ obtained in the above-mentioned unit cells satisfies the condition according to the following formula:

$$0.05 \leq \sigma_1/m_1 \leq 0.3.$$

The lower limit of this $\sigma_1/m_1$ is preferably 0.05, and more preferably 0.07, while the upper limit is preferably 0.3, and more preferably 0.25. When the value of $\sigma_1/m_1$ is less than 0.05, there is a tendency that the above-mentioned reflection property may not be obtained easily, and particularly, diffraction of light due to the distribution of uniform distances between peaks of irregularity occurs, and an anti-glare film looks rainbow color, consequently, lowering visibility. When the value of $\sigma_1/m_1$ is over 0.3, there is tendency that the above-mentioned reflection property may not be obtained easily, particularly, an anti-glare function may not be obtained sufficiently, and white browning of an anti-glare film may occur, lowering visibility.

The average value $m_1$ of the shortest distances between peaks of irregularities in unit cells is preferably 200 µm or less, more preferably 100 µm or less. When $m_1$ is over 200 µm, there is a tendency that distance between irregularity may become too large, and the area of parts without roughness increases, consequently, the regular reflection may increase, and the reflection property as described above cannot be obtained easily, and a sufficient anti-glare function may not be obtained.

Since distribution of shortest distances between peaks of irregularities is a statistical amount, it is preferable that the population has a certain degree of size. In the anti-glare film of the present invention, the number of irregularities in the above-mentioned unit cell is preferably 20 or more, more preferably 50 or more. When the number of irregularities is less than 20, there is a tendency that the period of the above-mentioned unit cell shortens, diffraction of light may occur due to disposition cycle of this unit cell, and an anti-glare film may look rainbow color, consequently, visibility may lower.

It is preferable that the above-mentioned unit cells in the anti-glare film of the present invention are placed so as to constitute translational symmetry on the surface of the anti-glare film as described above, and it is preferable that the period of this unit cell translational symmetry is a period of not less than the interfere-able distance of light used. Additionally, it is preferable that the period is larger than the pixel pitch of a display and is not integer times of the pixel pitch for avoiding moiré by the display. On the other hand, when the period is too large, load in producing roughness and design increases, as a result, the specific preferable period is from 50 to 10,000 μm, more preferably from 100 to 5,000 μm, being a range satisfying the above-mentioned preferable conditions. By the period satisfying such conditions, there is a tendency that lowering in visibility of a display plane due to the diffraction of light, generation of moiré and the like may be sufficiently suppressed.

In the anti-glare film of the present invention, disposition of the above-mentioned unit cells having translational symmetry and its period can be confirmed by, for example, a method of observing the surface of an anti-glare film by an optical microscope, a method in which light from a light source such as coherent laser and the like is enlarged to a beam spot larger than the period of translational symmetry and allowed to irradiate an anti-glare film, and a diffraction pattern by disposition of irregularities is observed, and other methods.

In the anti-glare film of the present invention, it is further preferable that also irregularities at the interface part of unit cells as described above are placed with suitable variety. Namely, also for irregularities in two adjacent unit cells, it is preferable that when the average value $m_2$ of shortest distances between peaks of irregularities and the standard deviation $\sigma_2$ of the above-mentioned shortest distances are measured and the value of $\sigma_2/m_2$ is calculated, this value of $\sigma_2/m_2$ satisfies the condition according to the following formula:

$$0.05 \leq \sigma_2/m_2 \leq 0.3.$$

By thus calculating the value of $\sigma_2/m_2$ in two adjacent unit cells, whether irregularities at the interface part of unit cells are placed with suitable variety or not can be determined. The lower limit of this $\sigma_2/m_2$ is preferably 0.05, and more preferably 0.07. On the other hand, the upper limit thereof is preferably 0.3, and more preferably 0.25. When the value of $\sigma_2/m_2$ is less than 0.05, there is a tendency that the reflection property as described above may not be obtained easily, and particularly, the diffraction of light caused by the distribution of distances between irregularity peaks may occur, and an anti-glare film may look rainbow color, as a result, visibility may lower. When the value of $\sigma_2/m_2$ is over 0.3, there is a tendency that the reflection property as described above may not be obtained easily, and particularly, an anti-glare function may not be obtained sufficiently, and white browning of an anti-glare film may occurs, lowering visibility.

The method of producing an anti-glare film of the present invention, suitable as a method for obtaining the anti-glare film of the present invention as described above, will be illustrated below.

The method of producing an anti-glare film of the present invention is comprises a step of performing gradient exposure on a photo-resist formed on a base material, a step of conducting development treatment thereon to form roughness on said photo-resist, a step of electro-casting a metal on the above-mentioned photo-resist, a step of peeling the above-mentioned metal from the above-mentioned photo-resist to produce a metal plate transferred the roughness, and a step of transferring the above-mentioned roughness onto a film using the above-mentioned metal plate.

In such an exposure step in the method of producing an anti-glare film of the present invention, first, a photo-resist is formed on a base material, to produce a base material with photo-resist. The above-mentioned base material includes, for example, inorganic transparent base materials such as glass, quartz, alumina and the like, and metal base materials such as copper, stainless steel and the like. The above-mentioned photo-resist include, for example, conventionally known positive resist compositions obtained by dissolving an alkali-soluble resin such as a novolak resin, acrylic resin, copolymer of styrene and acrylic acid, polymer of hydroxystyrene, polyvinylphenol, poly α-methylvinylphenol and the like, and a quinonediazize group-containing compound into an organic solvent, and conventionally known negative resist compositions obtained by dissolving a photo-sensitive resin containing an alkali-soluble resin, photo acid-generating agent, cross-linking agent and coloring matter into an organic solvent, and other compositions.

The thickness of a photo-resist formed on a base material may be appropriately controlled depending on the form and thickness of roughness to be formed on the surface of an anti-glare film of the present invention, and it is preferable that the membrane thickness is equivalent to or slightly larger than the thickness of the intended roughness. The preferable membrane thickness is the thickness of the intended roughness or more and the thickness of the intended roughness plus 5 μm or less.

The method of forming a photo-resist on a base material is not particularly restricted, and for example, membrane formation can be conducted by a spin coat method, dip coat method, roll coat method and the like. Further, it is preferable that after membrane formation, pre-bake is conducted at about 60 to about 120° C. for about 0.5 to about 10 minutes using a hot plate, oven or the like for removing a solvent contained in a photo-resist. The above-mentioned pre-bake temperature and time can be appropriately controlled depending on the kind of a photo-resist and sensitivity required for a photo-resist.

Next, gradient exposure is performed on a photo-resist formed on a base material thus produced. This gradient exposure can be conducted by conventionally known gradient exposure methods, and it is preferably conducted by a method in which proximity exposure is conducted on a photo-resist via at least a two gradient photo-mask, a method in which gradient exposure is conducted via at least a multi gradient photo-mask, or a method in which gradient exposure is conducted by using an space light modulation element capable of changing the light intensity of an exposure light source with at least the location. Gradient exposure conducted according to these methods will be illustrated below.

By using a two gradient photo-mask and conducting proximity exposure placing this mask at an interval from the surface of a photo-resist, light diffraction occurs at an edge portion of a mask pattern of the photo-mask, an image of the photo-mask blurs, and continuous distribution of light quantity is generated ranging over transmission parts to shading parts of a photo-mask. Since a photo-resist is sensitized depending on distribution of light quantity proximity-exposed, when a photo-resist is developed, the photo-resist remaining membrane changes depending on irradiation light quantity, and roughness are formed depending on the mast pattern and exposure amount on the surface of a photo-resist after exposure. Further, in this exposure process, optical systems such as lens and machine portions such as mask alignment system may intervene between an exposure light source and a photo-resist.

When proximity exposure is conducted using the above-mentioned two gradient photo-mask, it is preferable that if the distance between a photo-mask and a photo-resist is represented by L (μm) and the outer dimension of transmission portions of a photo-mask is represented by D (μm), then, proximity exposure is conducted satisfying the following formula:

$$1.3 \leq L/D^2 \leq 2.8.$$

The behavior of light transmitted through fine apertures is explained by Fresnel diffraction and Fraunhofer diffraction, and spreading of an image of light transmitted through apertures varies depending on an index $(L/D^2 \cdot \lambda)$ constituted of the distance between the aperture and a screen, the dimension (D) of the aperture and the wavelength λ of light. When the distance between the aperture and a screen is short, the form of the aperture is transferred onto the screen, and if the distance between the aperture and a screen becomes longer, light diffused from the light axis center is formed. Therefore, when the value of $L/D^2$ is less than 1.3, an exposed image formed on a photo-resist may mirror an aperture pattern on a photo-mask, and energy distribution also may change steeply depending on the aperture form, as a result, a penetration pore may be easily formed on a photo-resist, and the light diffusion function of the resulted anti-glare film tends to lower. On the other hand, when the value of $L/D^2$ is over 2.8, light diffracted at a photo-mask is diffused, formation of a pattern on the surface of a photo-resist may tend to become difficult. When the value of $L/D^2$ is 1.3 or more or 2.8 or less, there is a tendency that an exposure image suitable as the anti-glare film of the present invention is formed.

Next, a method of conducting gradient exposure via at least a multi gradient photo-mask on a photo-resist will be illustrated. The multi gradient photo-mask herein used is, differing from the above-mentioned two gradient photo-mask, a photo-mask showing transmittance varying continuously or in multi-stage depending on the position. As such a multi gradient photo-mask, there can be used those obtained by, for example, a method in which a photo-mask draught apparatus of high resolution such as an electron beam draught apparatus is used, a transmission part and a shading part smaller sufficiently than the wavelength of exposure light are provided, gradient is expressed by the area ratio of the shading part to the transmission part, giving a gradient mask, a method in which a substance sensitized by high energy beam such as electron beam, laser and the like to manifest change in transmittance is dispersed in a transparent medium to provide mask blanks which are irradiated with high energy beam while varying its intensity depending on the position to give a gradient mask showing continuously changing transmittance, a method in which a substance having photo-sensitivity and showing change in optical concentration depending on the quantity of irradiation light such as an emulsion is formed on a transparent base material, the emulsion is sensitized while changing the light quantity, to give a gradient mask showing optical density changing depending on the position, and other methods.

By conducting gradient exposure using such a multi gradient photo-mask, light corresponding to the gradient of a photo-mask sensitizes a photo-resist, consequently, irregularity corresponding to the light quantity irradiated after development of a photo-resist is formed on the photo-resist. Further, in this exposure step, optical systems such as lens and machine portions such as mask alignment system may intervene between an exposure light source and a photo-resist.

Next, the method in which gradient exposure is conducted by using an space light modulation element capable of changing the light intensity of an exposure light source with at least the location will be illustrated. The space light modulation element capable of changing the light intensity of an exposure light source with at least the location herein used is an element capable of spatially changing the intensity of light transmitted through the element or light reflected by the element, and it includes, for example, light modulation elements composed of a lot of pixels such as liquid crystal elements, digital micro mirror elements (DMD) and the like. When the above-mentioned liquid crystal element is used as a space light modulation element, it may be possible to set transmittance for each pixel of a liquid crystal element composed of a plurality of pixels, as a result, light having spatially uniform intensity distribution from an exposure light source can be transmitted through a liquid crystal element to obtain distribution of the intensity of exposure light depending on the transmittance of a pixel in a liquid crystal element, generating spatial distribution of the intensity of exposure light irradiated on a photo-resist. Namely, when a photo-resist is developed, the thickness of the photo-resist changes depending on the intensity of exposure light, resultantly, roughness can be formed on the surface of the photo-resist. The case of use of the above-mentioned DMD as a space light modulation element includes a case of reflecting light toward the direction of a photo-resist by inclination angle of a small mirror and a case of reflecting toward other direction than that of a photo-resist, and by changing time for reflection of light toward the direction of a photo-resist for each pixel, substantial reflectance per unit time can be changed for each pixel. Namely, by reflecting light having spatially uniform intensity distribution from an exposure light source on DMD, distribution of the intensity of exposure light depending on the time period during which a small mirror is inclined can be obtained, generating spatial intensity distribution of exposure light irradiated on a photo-resist. Namely, when a photo-resist is developed, the thickness of the photo-resist changed depending on the intensity of exposure light, consequently, roughness can be formed on the surface of the photo-resist. The space light modulation element capable of changing the light intensity of an exposure light source depending on the position used in the exposure process in the present invention is not limited to liquid crystal elements and DMD as described above, and even other space light modulation elements capable of producing spatial distribution of the intensity of light from an exposure light source can be used to produce distribution of the intensity of exposure light to a photo-resist based on the theory as described above, and to change distribution of the membrane thickness in developing a photo-resist, consequently, formation of surface roughness of a photo-resist becomes possible.

In the method of producing an anti-glare film of the present invention, roughness are formed on a photo-resist, by the proximity exposure method using a two gradient photo-mask, the gradient exposure method using a multi gradient photo-mask, the gradient exposure method using a space light modulation element and the like as described above, to give a raw plate, and irregular forms are continuously transferred finally onto a film using this raw plate, to produce the intended anti-glare film having roughness. Therefore, it is necessary to design a mask pattern for producing a photo-mask for producing a raw plate, and this mask pattern should be designed so as to obtain disposition of roughness necessary for the anti-glare film of the present invention as described above. Designing such a mask pattern over the whole surface of a photo-mask is very troublesome work, and load on a mask draught apparatus also increases because of increase in the capacity of data of a mask pattern, namely, such design is unreal though theoretically possible in the light of the present ability of calculator. Further, also in the method of conducting gradient exposure by a space light modulation element in producing a raw plate, it is necessary to impart data to allow light modulated by a space light modulation element to manifest given space distribution, and labor for generation of a pattern over the whole exposure region is heavy.

In the method of producing an anti-glare film of the present invention, a mask pattern is designed corresponding to a unit cell having a plurality of irregularities according to the anti-glare film of the present invention as described above, and this mask pattern is placed so as to give translational symmetry. By this, labor for mast pattern design as the whole photo-mask may be reduced, leading to industrial advantage.

The example of translational symmetry includes a grid-like alignment of the barycentric coordinate of a unit cell such as tetragonal lattice, rectangular lattice, orthorhombic lattice and hexagonal lattice.

The exposure light source used in the exposure step according to the present invention is not particularly restricted providing that it is a light source capable of sensitizing a photo-resist, and the exposure step can be conducted using, as a light source, visible light and ultra-violet ray having wavelength of g line, h line, i line and the like from a light source such as a high pressure mercury lamp, super high pressure mercury lamp and the like, and laser having oscillation wavelength near that of emission ling of mercury, and the like. The exposure light intensity is, thought not generally defined because of variation depending on the form of the intended roughness and the kind of a photo-resist and the like, preferably from about 50 to 2000 mJ/cm$^2$. The exposure time can be appropriately controlled depending on the exposure light source and the light quantity required.

In the exposure step in the present invention, gradient exposure is performed on the photo-resist as described above, then, development treatment is performed to form roughness on the photo-resist. This development treatment is treatment in which, for example, a photo-resist after exposure formed on a substrate is immersed in development liquid depending on its kind, and exposed portions are removed in the case of positive resist and non-exposed portions are removed in the case of negative resist, to form roughness on a photo-resist. As the above-mentioned development liquid, conventionally known development liquid can be appropriately selected and used depending on the photo-resist used. It is also preferable to rinse a photo-resist after development, with pure water and the like, further, it is also preferable to conduct post bake by heating for about 0.5 to about 30 minutes by an oven or hot plate heated to about 100 to about 200° C., and by this a solvent and water in a photo-resist can be removed to enhance close adherence with a substrate. The temperature and time for the above-mentioned post bake can be appropriately controlled depending on the kind of a photo-resist, and the like.

In the method of producing an anti-glare film of the present invention, after the exposure step as described above, a step of electro-casting is conducted in which a metal is electrically cast on a photo-resist, and the metal is peeled from the photo-resist, to produce a metal plate having roughness.

As the metal used in the above-mentioned electro-casting, metals conventionally used for electro-casting can be used without specific restriction, and for example, nickel, nickel-phosphorus alloy, iron-nickel alloy, chromium, chromium alloy and the like can be used. The thickness of a metal formed on a photo-resist by electro-casting is not particularly restricted and preferably from about 0.05 to 3 mm from the standpoint of durability, and the like.

When electro-casting is directly conducted on a photo-resist, it is necessary to make a photo-resist conductive before effecting electro-casting, and a photo-resist can be made conductive by conventionally known conductivity-imparting treatments, for example, a method of forming a metal membrane having a thickness of 1 µm or less by vapor-deposition, sputtering and the like, a method using electroless plating, and the like.

When direct electro-casting is not to be conducted on a photo-resist, it may also be permissible for example that the form of a photo-resist is transferred onto a resin, then, the conductivity-imparting treatment as described above and electro-casting may be conducted on this resin. It is possible to electro-cast a metal on a photo-resist as described above, then, to peel the metal from the photo-resist, to obtain a metal plate having roughness.

In the method of producing an anti-glare film of the present invention, the electro-casting step is conducted as described above, then, a transferring process of transferring roughness on a film using the resulted metal plate is conducted.

The film used in the above-mentioned transferring step may be composed of a single material or may be a film obtained by laminating a plurality of sublayers, and the film obtained by laminating a plurality of sublayers is preferable. The film obtained by laminating will be illustrated below.

The film obtained by laminating a plurality of sublayer includes, for example, those obtained by forming a thin layer of resin on a base material sheet made of a thermoplastic resin or inorganic substance, and the transferring step can be conducted by transferring roughness onto this resin layer. The sheet used as the above-mentioned base material includes sheets molded from a thermoplastic resin such as polyethylene terephthalate, polyethylene naphthalate, polycarbonate, polymethylmethacrylate, polyallylate, cellulose diacetate, cellulose triacetate, ethylene vinyl alcohol copolymer, norbornene-ethylene copolymer (manufactured by Mitsui Petrochemical Industries, Ltd., trade name: APEL and the like), norbornene-containing resin (manufactured by Japan Synthetic Rubber Co., Ltd., trade name: ARTON and the like), amorphous polyolefin (manufactured by Nippon Xeon Co., Ltd., trade name: ZEONEX and the like), optical polyester resin (manufactured by Kanebo Ltd., trade name: O-PET and the like), acryl-butadiene-styrene copolymer (manufactured by Toray Industries, Inc., trade name: TOY- OLACQUE transparent grade and the like), and sheets molded from inorganic substances such as glass, metal and the like.

On the other hand, as the thin layer of resin formed on a base material sheet includes, for example, layers made of thermoplastic resins, radiation-hardening resin compositions and the like. The above-mentioned thermoplastic resin as the material used in the above-mentioned base material can be used also as a resin layer. The above-mentioned radiation-hardening resin composition includes various coating radiation-hardening resin compositions such as for hard coat and the like, and radiation-hardening resin compositions such as UV ink, EB ink and the like. The compounding raw material of such radiation-hardening resin compositions can be prepared by mixing mono-functional or poly-functional various (meth)acrylates and the like, and if necessary, additives such as photo-polymerization initiators, sensitizers, antioxidants and the like can be compounded. Instead of the above-mentioned (meth)acrylate compositions, it is also possible to use compositions composed of epoxy, oxetane compound and photo-cation polymerization initiator.

The above-mentioned mono-functional (meth)acrylate includes, for example, isobonyl acrylate, tetrahydrofurfuryl acrylate, 2-hydroxy-3-phenoxy propyl acrylate, butoxy ethyl acrylate, lauryl acrylate, stearyl acrylate, benzyl acrylate, hexy diglycol acrylate, 2-hydroxy ethyl acrylate, 2-ethyl hexyl acrylate, cyclohexyl acrylate, phenoxy ethyl acrylate, dicyclopentadiene acrylate, polyethylene glycol acrylate, polypropylene glycol acrylate, nonylphenoxy ethyl cellosolve acrylate and the like, and as the poly-functional (meth)acrylate, there are listed, for example, poly-functional (meth)acrylates such as polyethylene glycol diacrylate, neopentyl glycol diacrylate, trimethylolpropane acrylate, pentaerythritol triacrylate and the like, poly-functional (meth)acrylate oligomers such as oligourethane (meth)acrylate, oligoester (meth)acrylate and the like. These mono-functional and poly-functional (meth)acrylates may be used singly or in combination of two or more.

The photo-polymerization initiator compounded include, for example, benzophenone, acetophenone, benzoin, benzisoisobutyl ether, benzoin isopropyl ether, benzoin ethyl ether, 4,4'-bis(dimethylamino)benzophenone, benzyl dimethyl ketal, 2-chlorothioxanetone, 2,4-dimethylthioxanetone, 2,2'-diisopropylthioxanetone, 1-hydroxycyclohexyl phenyl ketone, 2-methyl-1-[4-(methylthio)phenyl]-2-morpholinopropan-1-one, 2,4,6-trimethylbenzoyl phenyl diphosphine oxide and the like, and these can be used singly or in combination of two or more.

Further, the above-mentioned radiation-hardening resin composition can also be used for the purpose of controlling viscosity or improving applicability, or if necessary, in dilution with various solvents. Such dilution solvents include, general various organic solvents, and for example, alcohol-based compounds such as methanol, ethanol, 1-propanol, 2-propanol and the like, ketone-based compounds such as acetone, methyl ethyl ketone and the like, ester-based compounds such as ethyl acetate, propyl acetate, butyl acetate and the like, aromatic compounds such as toluene, xylene and the like, and these can be used singly or in combination of two or more.

As the method of transferring roughness formed on a metal plate onto a film as described above in the transferring process in the method of producing an anti-glare film of the present invention, a general transferring method can be used, and the transferring process can be conducted by, for example, a method in which the radiation-hardening resin composition as described above or the like is poured onto roughness on a metal plate, and the resin composition is hardened by irradiation with ultraviolet ray or electron beam to transfer the rough forms onto the surface of the resin composition, a method in which the thermoplastic resin as described above is heated at temperatures of not lower than Tg and softening point of the resin before it is pushed to the surface of a metal plate, to transfer the rough forms onto the surface of the resin, and other methods. When the size of roughness or the average distance between peaks of irregularities on the surface of a metal plate is small, it is preferable to use a radiation-hardening resin composition having lower viscosity than that of thermoplastic resins. Though the transferring step can be conducted also by such conventionally known method, it is preferable, in the method of producing an anti-glare film of the present invention, that before conducting the transferring step, a roll production step in which a metal plate having roughness formed thereon is wound on the surface of a roll to produce an emboss roll having roughness on its surface is conducted, and it is preferable to conduct the transferring step by continuously transferring the rough forms onto a film using this emboss roll. By using such a method, roughness can be continuously transferred onto a film having wider area with good efficiently, obtaining high productivity.

The method of producing an anti-glare film of the present invention can produce easily and securely an anti-glare film of the present invention having the roughness disposition as described above and having the above-mentioned reflection property by inclusion of the exposure process, the electro-casting process and the transferring process, as described above.

An anti-glare film obtained by the present invention can be set on the surface of a display such as a liquid display, plasma display panel, CRT display, organic EL display and the like. For setting on a display, for example, an anti-glare film of the present invention may be directly pasted on the surface of a display, alternatively in the case of a liquid display, it may also be permissible that an anti-glare film of the present invention is first pasted on a deflection plate which is then pasted on the surface of a display. In such a display equipped with an anti-glare film of the present invention, incidence light can be scattered by irregularities on the surface of the anti-glare film to blur a reflected image, obtaining excellent visibility.

EXAMPLES

The present invention will be illustrated more specifically based on examples and comparative examples below, but the examples do not limit the scope of the invention.

Example 1

First, 75 round apertures having a diameter (D) of 9 µm were provided in a region of 127 µm×127 µm so that the average value $m_1$ of shortest distances between center coordinates of the apertures was 14.7 µm and the standard deviation $\sigma_1$ of the shortest distances was 1.049. This was used as a unit cell, and several unit cells were placed at a period of 127 µm on the whole surface of a region of 80 mm×80 mm, to produced a two gradient photo-mask of 6 inch square.

Next, a positive photo-resist (manufactured by Tokyo Okasha K.K., trade name: PR13) was spin-coated on a glass plate giving a thickness of about 1.1 µm. The resulted glass plate with photo-resist was placed for 60 seconds on a hot plate heated at 110° C. for pre-bake. On this photo-resist, the above-mentioned photo-mask was kept so that the exposure gap was 180 μm (=L), and irradiated with light of g, h and i multi-line of a super high pressure mercury lamp as an exposure light source at a rate of 150 mJ/cm² in terms of h line, for effecting proximity exposure. The value of L/D² in this procedure was 2.22.

The glass substrate with photo-resist after exposure was immersed in a 0.5% potassium hydroxide aqueous solution of 23° C. for 80 seconds, then, rinsed with pure water. Thereafter, the substrate with photo-resist was heated for 18 minutes in an oven heated at 200° C., to obtain a photo-resist having roughness formed on its surface.

On thus obtained photo-resist, a nickel membrane was formed by a vapor-deposition method, imparting conductivity to the photo-resist. Next, on this photo-resist was formed a nickel membrane by electro-casting to give a thickness of about 0.3 mm, and the rear surface of the nickel membrane still adhered on the photo-resist was polished so that the thickness of the nickel membrane was 0.2 mm. The nickel membrane after polishing was peeled from the photo-resist, obtaining a metal plate having roughness on its surface.

50 parts by weight of UF8001 (trade name: manufactured by Kyoeisha Kagakusha K.K., oligourethane acrylate), 50 parts by weight of IBXA (trade name: manufactured by Kyoeisha Kagakusha K.K., isobonyl acrylate) and 2 parts by weight of IRGACURE 184 (trade name, manufactured by Chiba Specialty Chemicals) were mixed as material for a film, to obtain an ultraviolet-hardening resin composition (hereinafter, referred to as UV resin).

Thus obtained UV resin was poured onto roughness on the above-mentioned metal plate so as to give a thickness of about 7 μm, and covered by a PET film having a thickness of 80 μm. This was irradiated with light of a high pressure mercury lamp at a light quantity of 200 mJ/cm² to harden the UV resin, then, the PET film was peeled together with the UV resin from the metal plate, to obtain a transparent anti-glare film composed of a laminate of the UV resin having irregularities on its surface and the PET film.

The resulted anti-glare film was irradiated with light having a wavelength of 543.5 nm of He-He laser and the diffraction pattern was measured. From an angle from a spot of the zero dimension light to a spot of the primary light, the corresponding period was calculated, and the average value $m_1$ of the shortest distances between peaks of irregularities of a unit cell on the surface of the anti-glare film was measured to find 14.7 μm, coincided with the average value of the shortest distances of the aperture portions of the photo-mask used. The standard deviation was calculated to find 1.049, coincided with the standard deviation of the shortest distances of the aperture portions of the photo-mask used. From them, the value of $\sigma_1/m_1$ was calculated to be 0.07. From an angle of diffraction spots looking square lattice, the corresponding period was calculated to find 127 μm, coincided with the period of the unit cells of the photo-mask used.

COMPARATIVE EXAMPLE 1

As the anti-glare film, AG6 film (manufactured by Sumitomo Chemical Co., Ltd.) was prepared. Roughness on the surface of the AG6 film were in irregular disposition on the whole film surface, and the average value $m_1$ of the shortest distance between peaks of irregularities of a unit cell was 8.8 μm, the standard deviation thereof was 2.87, and the value of $\sigma_1/m_1$ was 0.326.

Measurement of Reflectance

Figure 3:
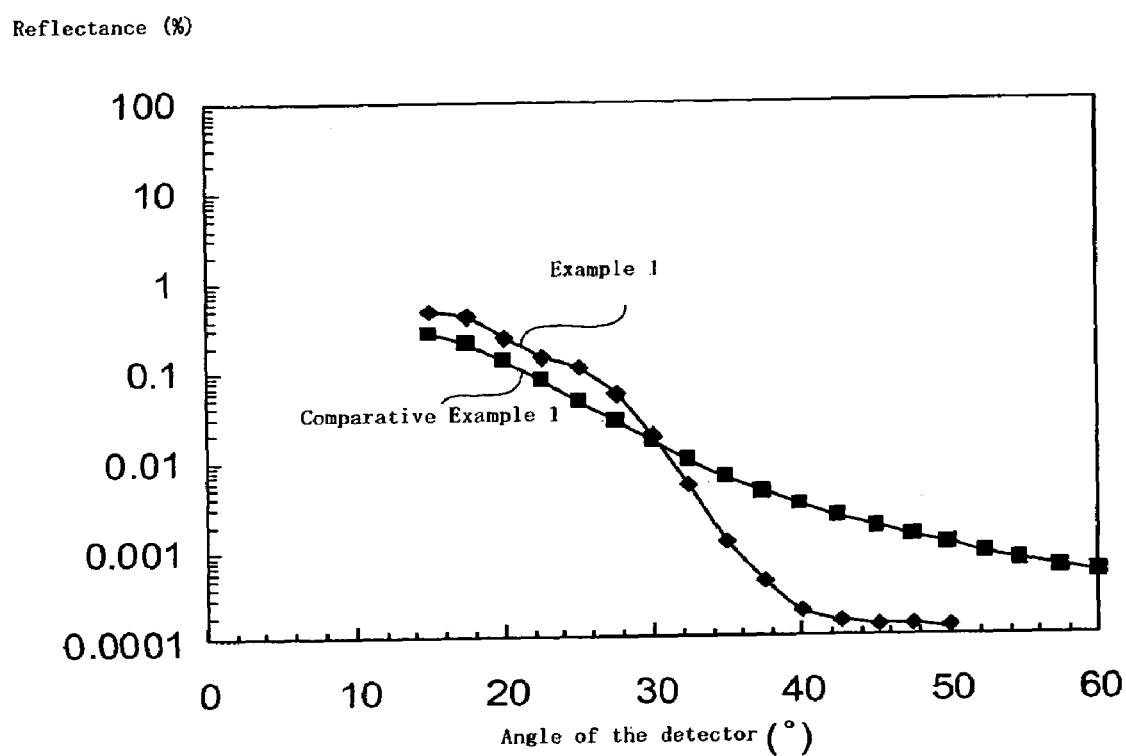
FIG. 3 is a graph showing the result of the reflectance profile for incidence light at an angle of 15° on the anti-glare films obtained in Example 1 and Comparative Example 1.
Figure 4:
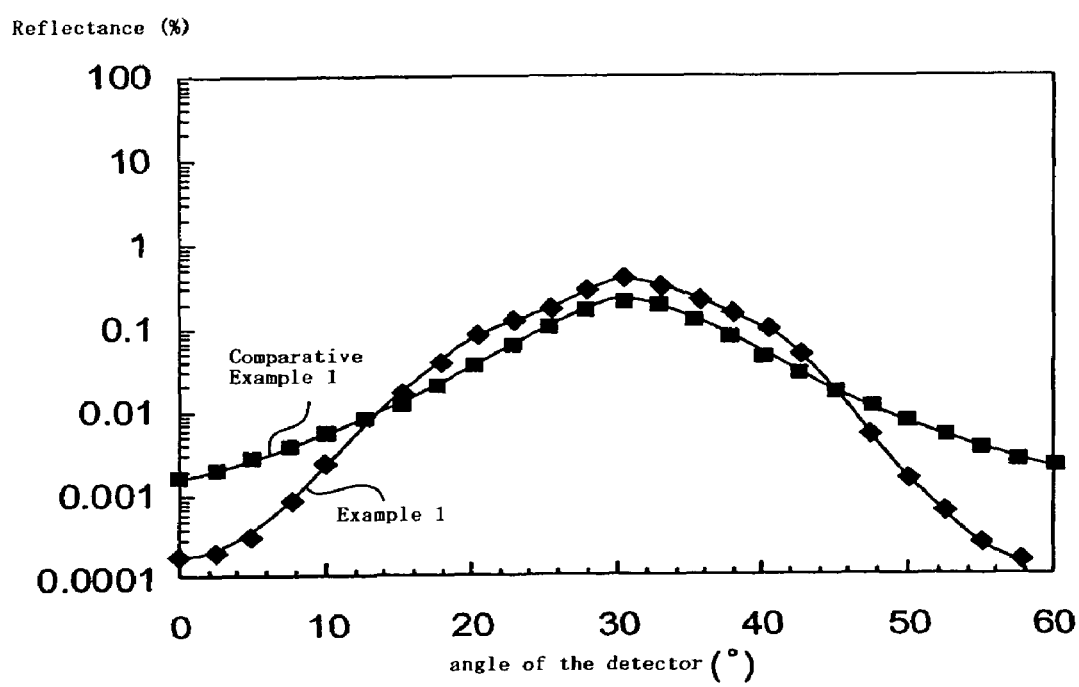
FIG. 4 is a graph showing the result of the reflectance profile for incidence light at an angle of 30° on the anti-glare films obtained in Example 1 and Comparative Example 1.

The reflectance profile of the anti-glare films obtained in Example 1 and Comparative Example 1 was measured as described below. Namely, an optical power meter (manufactured by Anritsu Corp., optical powder meter ML9001) was used as a detector, and an aperture was provided before this detector, and measurement was conducted using a deformation photometer setting the sample viewing angle at 2°. For the measurement of the reflectance, a halogen lamp (manufactured by Chuo Seiki K.K., SPH-100) was used as a light source, and light of 15 mmφ at the outlet of the converging optical system was allowed to converge so that it was 2.5 mmφ on a sample placed at a distance of 300 mm. As reference of the reflectance, the light quantity when detected by the above-mentioned optical powder meter through an aperture of 5 mmφ placed at a distance of 165 mm from a sample with no material being placed on the sample position was 100%. Then, the anti-glare film obtained in Example 1 and Comparative Example 1 was placed as a sample, and the angle of incidence light from the light source to the anti-glare film was set at 15°, and the light quantity when the detector with the aperture was rotated around the anti-glare film was measured, the angle dependency of the reflectance was measured, obtaining the reflectance profile. The resulted reflectance profile is shown in FIG. 3. The reflectance profile when the angle of incidence light from the light source to the anti-glare film was set at 30° was obtained in the same manner as in the above-mentioned measurement method. The resulted reflectance profile is shown in FIG. 4.

It is known from the obtained measurement results that, regarding the reflectance when the angle of incidence light from the light source to the anti-glare film was set at 15° in the case of the anti-glare film of Example 1, the regular reflectance R (0) along the regular reflection direction against incidence light was 0.42%, the reflectance R (30) along a direction inclined by 30° to the film side from the regular reflection direction was 0.00013%, and the value of R (30)/R(0) was 0.00031. In the case of the anti-glare film of Comparative Example 1, the regular reflectance R (0) along the regular reflection direction against incidence light was 0.23%, the reflectance R (30) along a direction inclined by 30° to the film side from the regular reflection direction was 0.00048%, and the value of R (30)/R(0) was 0.0069. In the anti-glare films of Example 1 and Comparative Example 1, the reflectance R (30 or more) along a direction inclined by 30° or more to the film side from the regular reflection direction was not more than the reflectance R (30) as shown in FIG. 3.

Regarding the reflectance when the angle of incidence light from the light source to the anti-glare film was set at 30° in the case of the anti-glare film of Example 1, the regular reflectance R (0) along the regular reflection direction against incidence light was 0.48%, the reflectance R (30) along a direction inclined by 30° to the film side from the regular reflection direction was 0.0001% or less, lower than the detection limit, and the value of R (30)/R (0) was 0.0002 or less. In the case of the anti-glare film of Comparative Example 1, the regular reflectance R (0) along the regular reflection direction against incidence light was 0.25%, the reflectance R (30) along a direction inclined by 30° to the film side from the regular reflection direction was 0.00212%, and the value of R (30)/R (0) was 0.0085. In the anti-glare films of Example 1 and Comparative Example 1, the reflectance R (30 or more) along a direction inclined by 30° or more to the film side from the regular reflection direction was not more than the reflectance R (30) as shown in FIG. 4.

Measurement of 60° Reflection Definition

The 60° reflection definition of the anti-glare films obtained in Example 1 and Comparative Example 1 was measured using ICM-1DP manufactured by Suga Shikenkisha K.K. while suppressing reflection from the rear surface by pasting a black vinyl tape on the rear surface of the anti-glare film. As a result, the 60° reflection definition was 114.3% in the case of the anti-glare film of Example 1, and 24.0% in the case of the anti-glare film of Comparative Example 1.

Measurement of Total Beam Transmittance and Haze

The total beam transmittance and haze of the anti-glare films obtained in Example 1 and Comparative Example 1 were measured using a haze computer (manufactured by Suga Shikenkisha K.K., HGM-2DP). As a result, the anti-glare film of Example 1 had a total beam transmittance of 82.1%, and a haze of 17.7%, and the anti-glare film of Comparative Example 1 had a total beam transmittance of 88.3%, and a haze of 24.9%.

Evaluation of Anti-Glare Function

The anti-glare films obtained in Example 1 and Comparative Example 1 were pasted on a black acryl plate with an adhesive material and illuminated by a tubular fluorescent lamp (manufactured by Otsuka Denshi K.K., model ENV-B type), and the luminance of the reflection light from the anti-glare film was measured using a luminance meter (manufactured by Topcon, BM7, 2° view field) placed along the normal line of the film. In measurement of luminance, the incidence angle of light was controlled by changing the height of the tubular fluorescent lamp so that the incidence angle into the anti-glare film was 10°, 15°, 20° and 30°, and the luminance of the reflection light from the anti-glare film against light of respective incidence angles. As a result, in the case of the anti-glare film of Example 1, the luminance of the reflection light for respective incidence angles was 61.4 cd/m$^2$, 15.6 cd/m$^2$, 7.9 cd/m$^2$ and 7.3 cd/m$^2$, respectively. In the case of the anti-glare film of Comparative Example 1, the luminance of the reflection light for respective incidence angles was 74.2 cd/m$^2$, 60.1 cd/m$^2$, 47.2 cd/m$^2$ and 33.2 cd/m$^2$, respectively. As is apparent from these results, it was confirmed that the luminance of the reflection light of the anti-glare film of Example 1 was lower as compared with the luminance of the reflection light of the anti-glare film of Comparative Example 1, indicating excellent anti-glare function, for incidence light at an angle. The anti-glare film of Example 1 shows rapid decrease in the reflection light luminance when the light incidence angle increases, enlarging a difference from the reflection light luminance of the anti-glare film of Comparative Example 1. From this fact, it was conformed that generation of white browning due to scattered light was reduced in the anti-glare film of Example 1 as compared with the anti-glare film of Comparative Example 1. This generation of white browning was further conformed by the following visual evaluation.

Evaluation of White Browning, Light Diffraction

The anti-glare films obtained in Example 1 and Comparative Example 1 were pasted on a black acryl plate with an adhesive and placed so that the incidence angle of light from a couple of fluorescent lamps was 30° in a bright room (in office environment in which couples each composed of two 40 W straight pipe fluorescent lamps were placed every 3 m) and visually observed by a tester along the normal line direction of the anti-glare film, as a result, it looked slightly white than the surrounding black acryl plate in the anti-glare film of Example 1, however, in the anti-glare film of Comparative Example 1, its looked white turbid as compared with the surrounding black acryl plate. Also from the result of the vial evaluation, it was confirmed that generation of white browning was reduced and visibility increased in the anti-glare film of Example 1 as compared with the anti-glare film of Comparative Example 1.

According to the same visual evaluation method, decrease in visibility due to light diffraction was observed by a tester, rainbow color believed to be caused by light diffraction was slightly observed in the anti-glare film of Example 1, however, no decrease in visibility was observed. On the other hand, in the anti-glare film of Comparative Example 1, rainbow color believed to be caused by light diffraction was observed, and decrease in visibility was observed.

Evaluation of Visibility When Pasted to Display

The anti-glare films obtained in Example 1 and Comparative Example 1 were pasted on a deflection plate which was pasted on the surface of a liquid crystal display, to produce displays equipped with an anti-glare film of the present invention. The same image was displayed on these displays, and the displays were placed so that the incidence angle of light from a couple of fluorescent lamps was 30° in a bright room (in office environment in which couples each composed of two 40 W straight pipe fluorescent lamps were placed every 3 m) and visually observed by a tester along the normal line direction of the anti-glare film, as a result, in the display equipped with the anti-glare film of Example 1, decrease in visibility of the display image was not observed and a sufficient anti-glare function was conformed, while in the display equipped with the anti-glare film of Comparative Example 1, reflection of outer light was generated, and decrease in visibility of the display image was observed.

As apparent from the above-mentioned results, in the anti-glare film of the present invention (Example 1), an excellent anti-glare function was shown as compared with the anti-glare film of Comparative Example 1, and sufficient prevention of reduction in visibility due to white browning and light diffraction was conformed.

As described above, an anti-glare film in which generation of white browning and reduction in visibility due to light diffraction are sufficiently prevented while maintaining an excellent anti-glare function, a method of producing the same, and a display equipped with such an anti-glare film can be obtained according to the present invention.

What is claimed is:

1. An anti-glare film having a rough surface of which R (0) is 1% or less, and R (30 or more)/R (0) is 0.001 or less,
   wherein R (0) is the regular reflectance along the regular reflection direction against incidence light at any angle from 5 to 30° from the normal line of said anti-glare film and
   R (30 or more) is the reflectance against said incidence light, along a direction inclined by 30° or more toward said anti-glare film side from said normal reflection direction, and
   wherein the roughness of the surface is divided into unit cells having a plurality of irregularities, the average value of a minimum distance between peaks of said irregularities is from 14.7 μm to 200 μm, and the irregularities constituting mutual translational symmetry with irregularities in other unit cells.

2. The anti-glare film according to claim 1, wherein the 60° reflection definition is 200% or less.

3. The anti-glare film according to claim 1 or 2, wherein the average value of minimum distances between peaks of said irregularities ($m_1$) and the standard deviation of the said minimum distances ($\sigma_1$) in said unit cells, satisfies the following formula:

$$0.05 \leq \sigma_1/m_1 \leq 0.3.$$

4. A method of producing an anti-glare film according to claim 1, comprising
   a step of performing gradient exposure on a photo-resist formed on a base material, a step of conducting development on to form roughness on said photo-resist,
   a step of electro-casting a metal on said photo-resist,
   a step of peeling said metal from said photo-resist to produce a metal plate transferred the roughness, and
   a step of transferring said roughness onto a film using said metal plate.

5. The method of producing an anti-glare film according to claim 4, wherein
   the step of transferring said roughness comprises a step of winding said metal plate on the surface of a roll to produce an emboss roll having said roughness on its surface, and a step of continuously transferring said roughness onto a film using said emboss roll.

6. The method of producing an anti-glare film according to claim 4 or 5, wherein
   the step of performing gradient exposure is conducted by performing proximity exposure at least via a photo-mask of two gradients on said photo-resist, and the distance between said photo-mask and said photo-resist (L μm) and the outer dimension of transmission portions of said photo-mask (D μm satisfies the following formula:

$$1.3 \leq L/D^2 \leq 2.8.$$

7. The method of producing an anti-glare film according to claim 4 or 5, wherein the step of performing gradient exposure is conducted at least via a photo-mask of multi gradients on said photo-resist.

8. The method of producing an anti-glare film according to claim 4 or 5, wherein the step of performing gradient exposure is conducted by using a space light modulation element capable of changing the light intensity of an exposure light source with at least the location on said photo-resist.

9. A display equipped with an anti-glare film according to claim 1.

10. An anti-glare film according to claim 1, wherein said anti-glare film is obtained by
   a step of performing gradient exposure on a photo-resist formed on a base material, a step of conducting development on to form roughness on said photo-resist,
   a step of electro-casting a metal on said photo-resist,
   a step of peeling said metal from said photo-resist to produce a metal plate transferred the roughness, and
   a step of transferring said roughness onto a film using said metal plate.

* * * * *